US010357848B2

(12) United States Patent
Chen et al.

(10) Patent No.: US 10,357,848 B2
(45) Date of Patent: Jul. 23, 2019

(54) LASER MACHINING SYSTEMS AND METHODS

(71) Applicant: GENERAL ELECTRIC COMPANY, Schenectady, NY (US)

(72) Inventors: Hongqiang Chen, Niskayuna, NY (US); Steven Robert Hayashi, Niskayuna, NY (US); Xi Zhang, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 663 days.

(21) Appl. No.: 14/599,612

(22) Filed: Jan. 19, 2015

(65) Prior Publication Data

US 2016/0207143 A1    Jul. 21, 2016

(51) Int. Cl.
| | |
|---|---|
| *B23K 26/06* | (2014.01) |
| *B23K 26/04* | (2014.01) |
| *B23K 26/08* | (2014.01) |
| *B23K 26/38* | (2014.01) |
| *B23K 26/40* | (2014.01) |
| *B23K 103/00* | (2006.01) |

(52) U.S. Cl.
CPC ........ *B23K 26/0648* (2013.01); *B23K 26/048* (2013.01); *B23K 26/0853* (2013.01); *B23K 26/38* (2013.01); *B23K 26/40* (2013.01); *B23K 2103/00* (2018.08)

(58) Field of Classification Search
None
See application file for complete search history.

(56) References Cited

U.S. PATENT DOCUMENTS 4,638,800 A * 1/1987 Michel ................. A61B 18/201
                                                      606/10
5,033,806 A   7/1991 Tomita et al.
(Continued)

FOREIGN PATENT DOCUMENTS

| CN | 101856772 A | 10/2010 |
| CN | 101965243 A | 2/2011 |

(Continued)

OTHER PUBLICATIONS

Li et al., "Hole Taper Characterisation and Control in Laser Percussion Drilling," CIRP Annals—Manufacturing Technology, Sciencedirect, 2002, pp. 153-156, vol. 151, Issue 1.

(Continued)

*Primary Examiner* — Ibrahime A Abraham
*Assistant Examiner* — Gyounghyun Bae
(74) *Attorney, Agent, or Firm* — Dority & Manning, P.A.

(57) ABSTRACT

A laser machining method includes directing, from an F-theta lens having a long focal length of greater than about 250 millimeters, a laser beam at a non-perpendicular beam tilt angle from an optical axis of the lens having a top-hat profile and a narrow beam divergence angle of between about 1 degree and about 3 degrees towards a workpiece on a stage movable in at least an X-direction and a Y-direction, engaging the directed laser beam with the workpiece disposed in the usable field of view, moving the workpiece and the directed laser beam relative to each other, and removing portions of the workpiece with the directed laser beam to define a machined surface.

20 Claims, 7 Drawing Sheets

(56) References Cited

U.S. PATENT DOCUMENTS

| | | | |
|---|---|---|---|
| 5,151,389 A * | 9/1992 | Zappella | B28D 1/221 |
| | | | 219/121.67 |
| 5,367,399 A * | 11/1994 | Kramer | G02B 26/106 |
| | | | 250/236 |
| 5,638,176 A * | 6/1997 | Hobbs | G01B 11/26 |
| | | | 356/484 |
| 5,744,780 A | 4/1998 | Chang et al. | |
| 6,089,698 A * | 7/2000 | Temple | B41J 2/162 |
| | | | 219/121.7 |
| 6,285,002 B1 * | 9/2001 | Ngoi | B08B 7/0042 |
| | | | 219/121.68 |
| 6,294,778 B1 * | 9/2001 | Cappiello | G02B 13/0005 |
| | | | 250/216 |
| 6,324,015 B1 * | 11/2001 | Fuse | B23K 26/0643 |
| | | | 359/206.1 |
| 6,455,807 B1 * | 9/2002 | Scott | B23K 26/034 |
| | | | 219/121.62 |
| 6,501,045 B1 * | 12/2002 | Bernstein | B23K 26/384 |
| | | | 219/121.69 |
| 6,586,707 B2 | 7/2003 | Boyle et al. | |
| 7,357,486 B2 * | 4/2008 | Cahill | B23K 26/067 |
| | | | 219/121.6 |
| 7,489,429 B2 | 2/2009 | Scaggs et al. | |
| 8,237,080 B2 | 8/2012 | Howerton et al. | |
| 2002/0170891 A1 * | 11/2002 | Boyle | B23K 26/12 |
| | | | 219/121.67 |
| 2004/0188401 A1 | 9/2004 | Mori et al. | |
| 2005/0056626 A1 * | 3/2005 | Gross | B23K 26/067 |
| | | | 219/121.77 |
| 2008/0049285 A1 | 2/2008 | Pinard et al. | |
| 2009/0057282 A1 | 3/2009 | Huang et al. | |
| 2009/0071947 A1 | 3/2009 | Sekiguchi et al. | |
| 2009/0095721 A1 * | 4/2009 | Scaggs | G02B 26/101 |
| | | | 219/121.67 |
| 2009/0151996 A1 * | 6/2009 | Mishima | B23K 26/18 |
| | | | 174/262 |
| 2010/0193483 A1 | 8/2010 | Chen et al. | |
| 2010/0197116 A1 * | 8/2010 | Shah | B23K 26/38 |
| | | | 438/463 |
| 2010/0303416 A1 * | 12/2010 | Danley | G02B 6/25 |
| | | | 385/55 |
| 2012/0132629 A1 | 5/2012 | O'Brien et al. | |
| 2013/0175243 A1 | 7/2013 | Wang | |
| 2014/0263212 A1 * | 9/2014 | Zhang | B23K 26/082 |
| | | | 219/121.69 |
| 2015/0001194 A1 * | 1/2015 | Unrath | B23K 26/0732 |
| | | | 219/121.61 |

FOREIGN PATENT DOCUMENTS

| | | |
|---|---|---|
| CN | 104174995 A | 12/2014 |
| DE | 102008045778 A1 | 3/2009 |
| JP | 07009172 A | 1/1995 |
| JP | 2009208092 A | 9/2009 |
| JP | 2009297781 A | 12/2009 |
| JP | 2012071314 A | 4/2012 |
| JP | 2013082006 A | 5/2013 |
| JP | 2014226706 A | 12/2014 |

OTHER PUBLICATIONS

European Search Report and Written Opinion issued in connection with corresponding EP Application No. 16151730.5 dated Jul. 1, 2016.

EP Search Report and Written Opinion dated Jul. 1, 2016 issued in connection with corresponding Application No. 16151730.5.

JP Office Action dated Feb. 7, 2017 issued in connection with corresponding Application No. 2016005742.

CN Office Action dated Feb. 27, 2017 issued in connection with corresponding Application No. 201610033089.0.

* cited by examiner

LASER MACHINING SYSTEMS AND METHODS

TECHNICAL FIELD

The present disclosure relates generally to laser machining, and more particularly, to laser machining systems and methods using laser beams having uniform beam profile and narrow beam divergence for forming zero and negative taper machined cuts.

BACKGROUND

In laser machining, a laser beam generation device is used in conjunction with an optical system to direct the laser beam onto a workpiece that is to be machined. The impingement of the laser beam on the workpiece locally melts and/or vaporizes the workpiece material to produce or extend a hole or cut in the workpiece. The location of the laser beam impingement point on the workpiece may be controlled by moving one or both of the laser beam and the workpiece relative to one another to thereby control the geometry of the hole or cut.

Laser machining of workpieces often produce edges along the cut features that exhibit taper. One approach to avoid tapered edges is to use a special trepanning head to rotate the laser beam at a spot location with a fixed tilt angle. The part remains stationary. Such an approach is only good for small hole drilling. Another approach is to rotate the part physically while keeping the laser beam at the same incident angle, which need high precision CNC stage (usually 4-5 axis) and sophisticated control software to achieve a zero taper cut.

There is a need for laser machining systems and methods using laser beams having uniform beam profile and narrow beam divergence for forming zero and negative taper machined cuts.

SUMMARY

The present disclosure provides, in a first aspect, a method for laser machining a workpiece. The method includes directing, from an F-theta lens having a long focal length of greater than about 250 millimeters, a laser beam at a non-perpendicular beam tilt angle from an optical axis of the lens having a top-hat profile and a narrow beam divergence angle of between about 1 degree and about 3 degrees towards a workpiece disposed on a stage movable in at least an X-direction and a Y-direction, engaging the directed laser beam with the workpiece disposed in the usable field of view, moving the workpiece and the directed laser beam relative to each other, and removing portions of the workpiece with the directed laser beam to define a machined surface.

The present disclosure provides, in a second aspect, a laser micromachining system for laser machining a workpiece. The laser micromachining system includes a laser, a converter, an F-theta lens a stage, a beam steering device, and a controller. The laser is operable to generate a laser beam having a Gaussian profile. The converter is operable to convert the laser beam having the Gaussian profile into the laser beam having the top-hat profile. The F-theta lens has a long focal length of greater than about 250 millimeters. The stage is operable to support and move the workpiece movable in at least an X-direction and a Y-direction. The beam steering device is operable for receiving the laser beam having the top-hat profile and directing the laser beam through the F-theta lens at an angle from an optical axis of the lens towards the workpiece on the stage. The laser beam is directable over a range of angles from the optical axis of the lens defining a usable field of view having a perimeter and having a narrow beam divergence angle of between about 1 degree and about 3 degrees. The controller is operable to control motion of said stage and/or said beam steering device to orientate the laser beam having the top-hat profile through the F-theta lens and onto the workpiece removing portions of the workpiece with the directed laser beam to define a machined surface.

DRAWINGS

The foregoing and other features, aspects and advantages of this disclosure will become apparent from the following detailed description of the various aspects of the disclosure taken in conjunction with the accompanying drawings, wherein.

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

The present disclosure addresses and enhances, inter alia, laser machining processes, and more specifically, laser machining systems employing a laser beam having less divergence and a more uniform profile so that less beam tilt angle is required for achieving zero or negative taper machined cuts. For example, the technique of the present disclosure may include converting a laser beam having a Gaussian beam profile 11 into a laser beam having a top-hat beam profile 13, and passing the top-hat laser beam through an F-theta lens 51 having a long focal length. As described in greater detail below, the directed top-hat profile laser beam from the F-theta lens has a generally narrow angle of divergence and high intensity. In addition, the directed top-hat profile laser beam from the F-theta lens is operable for forming zero taped cuts closer to the optical axis of the F-theta lens and spaced apart from the perimeter of the usable field of view of the F-theta lens. Line cuts and grooved slots may be readily implemented in combination with a two-dimensional stage for supporting and moving the workpiece to be machined. With such a technique for laser machining, systems employing the same may be less expensive compared to conventional laser machining requiring special trepanning heads or expensive precision CNC machines. Such a technique may also be operable with less power loss compared to conventional laser machining processes. Further, such a technique may be suitable for ceramic matrix composite tensile bar cutting and may be applied to other features such as seal slot as well.

Figure 1:
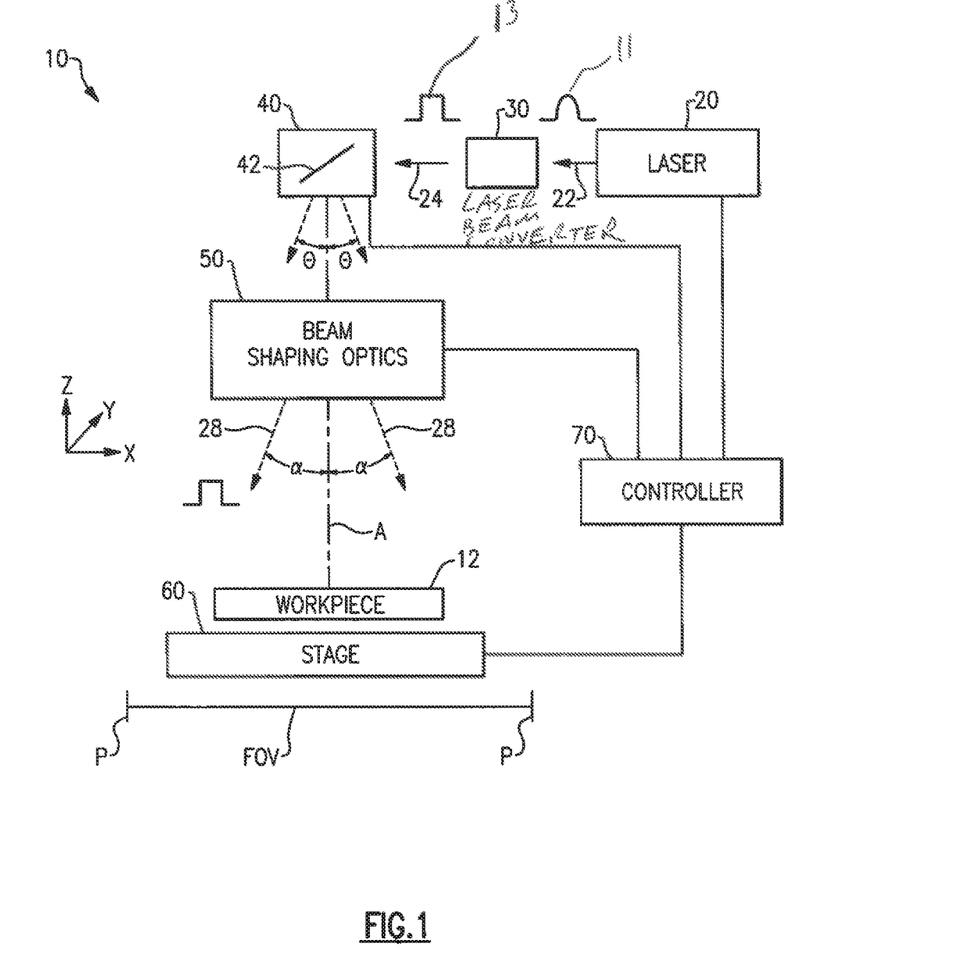
FIG. 1 is a schematic diagram of a laser machining system in accordance with aspects of the present disclosure operable for machining a workpiece.

FIG. 1 is a schematic diagram of a laser machining system 10, in accordance with aspects of the present disclosure, operable for machining a workpiece having a zero taper or a controlled or angled taper. For example, laser micromachining system 10 may generally include a laser 20, a laser beam converter 30, a beam steering device 40, beam shaping optics 50, a movable stage 60 on which is supportable a workpiece 12, and a controller 70.

The laser source may be any type of laser system that is capable of producing a laser beam of sufficient power, coherency, pulse width, pulse repetition time, and wavelength to be compatible with the performing the desired machining operations upon the selected workpiece. For example, the laser source may be a solid state, CO2, or fiber laser having a power of about 0.1 Watts to about 20,000 Watts. As those skilled in the art will appreciate, the optical components used in the laser system are operably compatible with the laser source so as to avoid damaging those components during operation. Laser 20 may emit a laser beam 22 or pulses having a Gaussian profile 11 distribution or spatial properties over a cross section that are convened or reshaped in converter 30 to a laser beam 24 or laser pulses having a top hat profile 13 distribution or spatial properties over a cross-section. In such an intensity profile of the top hat profile, the intensity of the beam is relatively constant across the cross section such as diameter of the laser beam, unlike the intensity profile of the Gaussian beam. Accordingly, the edges of the shaped beam have approximately the same intensity as the center of the beam, providing reduced intensity drop cuff at the beam's edge. The Gaussian to top-hat converters may be an optical device to convert one or two-dimensional single-mode Gaussian laser beam profiles to a flat top profile, while minimizing transmission loss. The converter may employ refractive elements, diffractive elements, optical fibers, other operable components, and combinations thereof.

Beam steering device 40 may include a movable mirror 42 for receiving laser beam 24 having a top hat profile distribution and redirecting laser beam 24 towards beam shaping optics 50. For example, an x-y tilt mirror may be used to position or scan a laser spot on the workpiece for machining. The mirror in the beam steering device may be dynamically and reciprocally tiltable around a first axis which is perpendicular to the optical axis A of beam shaping optics 50. The mirror in the beam steering device may also be dynamically and reciprocally tiltable around a second axis which is perpendicular to the first axis. For example, the beam steering device may include two galvanometer-based scanners, arranged one each on the x- and y-axes, and include a galvanometer, a mirror (or mirrors) and a servo driver board that controls the beam steering device.

Beam shaping optics 50 may include an F-theta lens having a long focal length such as a focal length greater than about 250 millimeters, greater than 250 millimeters, between about 250 millimeters and about 420 millimeters, greater than about 420 millimeters, or greater than 420 millimeters. The combination of the beam steering device 40 and beam shaping device 50 results in a controllable directed laser beam 28 having a top hat profile towards workpiece 12 disposed on stage 60. The F-theta lenses is designed both to form an image on a flat plane and to provide a linear relationship between the scan length x and the scan or inclination angle θ, in accordance with the following so-called F-Theta condition:

$$x=f\theta.$$

Scan length x is simply equal to the incident scan angle θ multiplied by the focal length f, i.e. the position of the spot on the image plane is directly proportional to the scan angle. This eliminates the need for complicated electronic correction required with standard scanning lenses.

The laser beam does not pass directly though the center of the focusing lens. Instead, the laser beam enters the lens at an angle θ relative to optical axis A of the lens. The lens bends the laser beam, causing the beam to reach the workpiece at a beam tilt angle α relative to the center axis of the lens. Beam tilt angle α depends on the lens geometry and the distance between the laser beam and the center axis of the lens. Varying the distance between the laser beam and the central axis will change beam tilt angle α. In one aspect, during laser machining the laser beam may remain at a constant distance from the optical axis of the lens, resulting in a constant beam tilt angle α. Directed laser beam 28 is directable on beam tilt angle α relative to central optical axis A of beam shaping optics 50 over a field of view FOV having a perimeter P.

Stage 60 may include motion control devices (not shown) for holding workpiece 12 and moving the workpiece in relation to the laser beam axis along an X-direction and a Y-direction. For example, the stage may include an X-axis linear motor and a Y-axis linear motor. It will be appreciated that a suitable stage may be movable with up to six axes which include translation in three orthogonal axes (X, Y and Z) and rotation about the three axes.

Controller 70 may be an operable computing unit including a processor or microprocessor, one or more input and output devices, and one or more memories. Controller 70 is operably connected to laser 20, beam steering device 40, beam shaping optics 50, and stage 60. Controller 70 is operable to direct the laser to emit the laser beam or pulses along the laser beam path and coordinate the beam steering optics and the stage to position the workpiece relative to the directed laser beam to cause the directed laser beam to engage the workpiece to effect the laser machining. The command signals from the controller are generally output based on programming instructions stored in memory, and the functions of each of the programming instructions are performed by the logic of the computing unit. The various components such as the beam steering device may include their own controllers that transmit data to and from the controller. Moreover, the controller could be incorporated into a computer, such as a personal computer.

Figure 2:
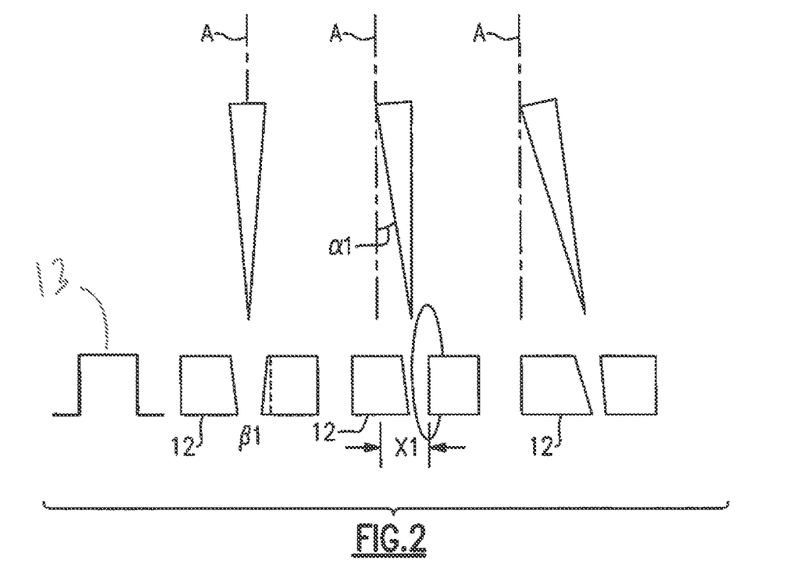
FIG. 2 is are side elevational, cross-sectional views of a plurality of machined cuts made using the laser machining system of FIG. 1 employing a laser beam having a top-hat profile.
Figure 3:
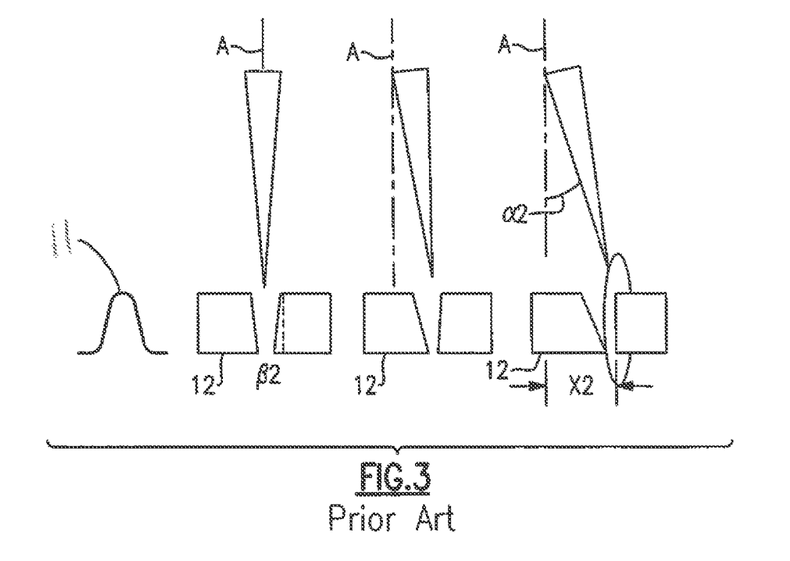
FIG. 3 are side elevational, cross-sectional views of a plurality of machined cuts made using a conventional prior art laser machining system employing a laser beam having a Gaussian profile.

FIG. 2 illustrates laser machining employing the system of FIG. 1 in accordance with aspects of the present disclosure and in which a laser beam or pulses have a top hat intensity profile distribution for obtaining three cuts at different beam tilt angles $\alpha$ in workpiece 12 relative to vertical optical axis A of the beam shaping optics. FIG. 3 illustrates a prior art approach for laser machining employing a laser beam or pulses having a Gaussian intensity profile distribution for obtaining three cuts at different beam tilt angles $\alpha$ in workpiece 12 relative to vertical optical axis A of the beam shaping optics. As illustrated in the comparison between FIGS. 2 and 3, use of a top-hat beam profile reduces the taper angle $\beta 1$ (e.g., between about 3 degrees and about than 5 degrees) of a machined cut or surface compared to a taper angle $\beta 2$ of a cut or machined surface made using a laser beam having a Gaussian profile. In addition, less of a beam tilt angle $\alpha 1$ (e.g., between about 4 degrees and about 7 degrees) is needed to achieve zero taper cut using a laser beam having top hat profile compared to the beam tilt angle $\alpha 2$ when employing a laser beam having a Gaussian intensity distribution profile. Further, less beam tilt angle $\alpha$ and taper angle $\beta$ allows machining a zero taper cut, e.g., at a smaller distance X1 from the optical axis A of the beam shaping optics within a larger region inside the perimeter P (FIG. 1) of the scan head field of view FOV (FIG. 1) compared to a distance X2 using a laser beam having a Gaussian intensity distribution profile.

Figure 4:
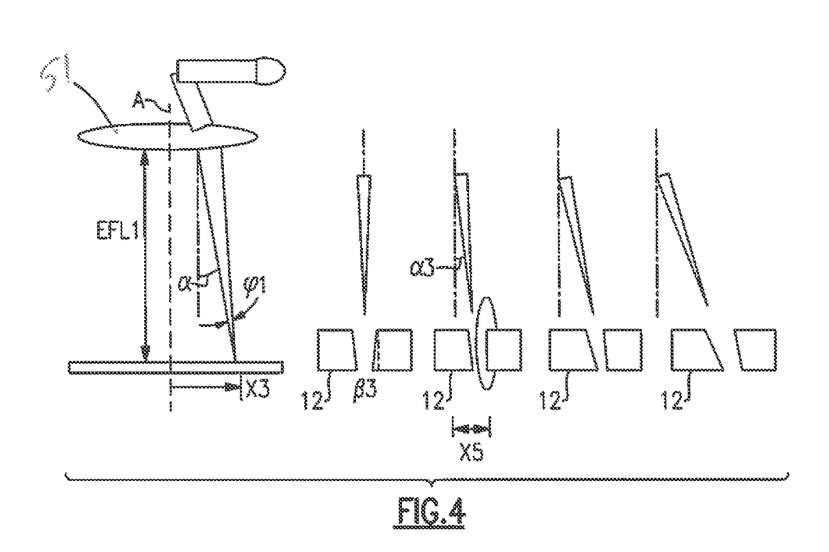
FIG. 4 are side elevational, cross-sectional views of a plurality of machined cuts made using the laser machining system of FIG. 1 employing an F-theta lens with a long focal length.
Figure 5:
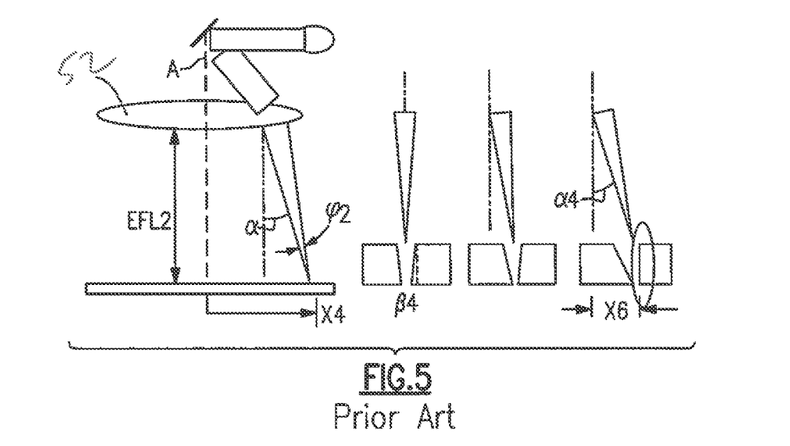
FIG. 5 are side elevational, cross-sectional view of a plurality of machined cuts made using a conventional prior art laser machining system a lens having a short focal length.

FIG. 4 illustrates laser machining employing the system of FIG. 1 in accordance with aspects of the present disclosure employing beam shaping optics 50 such as an F-theta lens 51 having a long effective focal length EFL1 (e.g., greater than about 250 millimeters) for obtaining four cuts at different angles $\alpha$ relative to a vertical optical axis A of the beam shaping optics. FIG. 5 illustrates a prior art approach for laser machining employing a laser beam or pulses employing a beam shaping optics 52 having a short effective focal length EFL2 for obtaining three cuts at different angles $\alpha$ relative to a vertical optical axis A of the beam shaping optics. As illustrated in the comparison between FIGS. 4 and 5, using an F-theta lens 51 with a long focal length has a less beam divergence angle $\varphi 1$ (e.g., between about 1 degree and about 3 degrees) compared to a beam divergence angle $\varphi 2$ of a lens 52 having a short focal length. In addition, use of an F-theta lens with a long focal length has a smaller taper angle $\beta$ (e.g., between about 3 degrees to less than 5 degrees) of a machined cut or surface compared to a taper angle $\theta 4$ of a machined cut or surface made using a lens having a short focal length. Further, less of a beam tilt angle $\alpha 3$ (e.g., between about 4 degrees and about 7 degrees) is needed to achieve zero taper cut using an F-theta lens with a long focal length compared to the beam tilt angle $\alpha 4$ when employing a lens having a short focal length. Also, less beam tilt angle allows machining a zero taper cut, e.g., at a distance X3 from the optical axis A of the beam shaping optics within a larger region inside the perimeter P (FIG. 1) of the scan head field of view FOV (FIG. 1). Further, less beam tilt angle $\alpha$ and taper angle $\alpha$ allows machining a zero taper cut, e.g., at a smaller distance X3 from the optical axis A of the beam shaping optics within a larger region inside the perimeter P (FIG. 1) of the scan head field of view FOV (FIG. 1) compared to a distance X4 using a lens having a short focal length. In other words, less beam tilt angle ($\alpha 3<\alpha 4$) is needed with smaller beam divergence angle $\varphi$. A smaller beam tilt for zero taper allows machining within a larger region inside the perimeter of the scan head field of view.

Further embodiments of the laser machining system of FIG. 1 in accordance with aspects of the present disclosure may include use of a laser beam or pulses have a top hat intensity profile distribution in combination with beam shaping optics such as an F-theta lens 51 having a long effective focal length EFL1 (e.g., between about 250 millimeters and about 420 millimeters). Such a configuration may result in even less of a beam tilt angle $\alpha$ (e.g., between about 3 degrees and about 6 degrees) needed to achieve a zero taper cut compared to the beam tilt when employing a laser beam having a Gaussian intensity distribution profile and a lens having a short focal length. In addition, such a configuration results in a smaller beam tilt for zero taper allowing machining within a larger region inside the perimeter (e.g., between about 15 mm to about 30 mm from the perimeter) of the scan head field of view.

It will be appreciated that the technique of the present disclosure generally allows reducing and/or controlling the taper of a cut or machined surface during laser machining. Specific laser beam incident or tilt angle can be selected to machine features with zero or even negative taper cut angle. For example, by using an X-Y motion stage, one can shift a desired laser machining feature of a workpiece to a calibrated distance from the optical center or axis of the beam shaping optics and direct the laser beam with a desired beam tilt angle so that that a zero or even negative taper cut through the sample thickness is performed corresponding to the desired laser machining feature. By controlling the laser processing parameters and shift distance, different degree of taper (from positive to negative) can be achieved.

Figure 6:
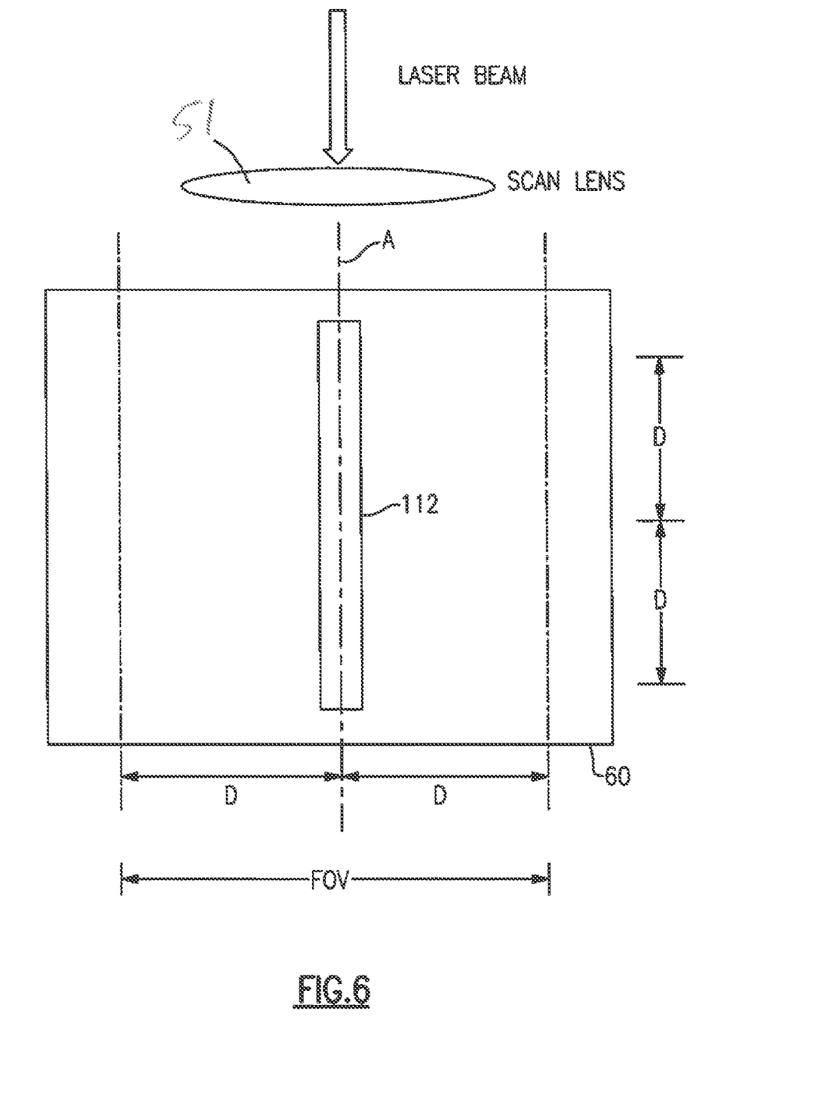
FIGS. 6-8 are pictorial illustrations of a laser machining method in accordance with aspects of the present disclosure.
Figure 7:
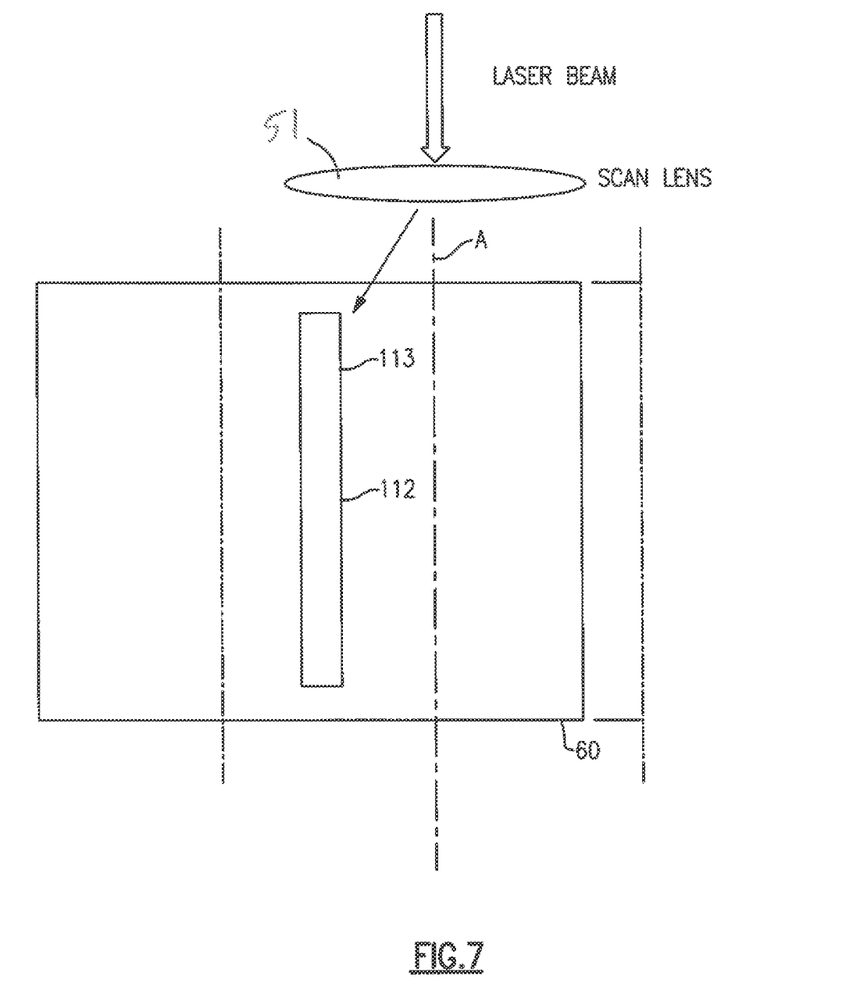
Figure 8:
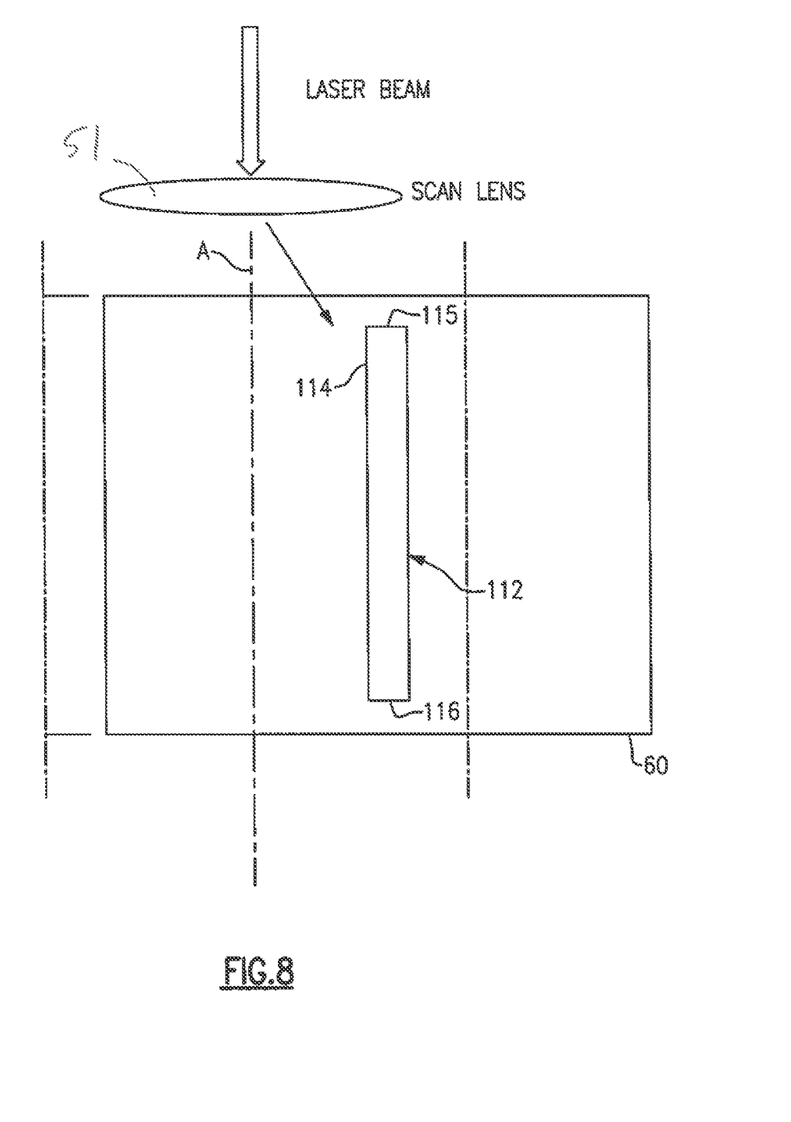

FIGS. 6-8 diagrammatically illustrates a process in accordance with aspects of the present disclosure for achieving generally the same machined taper angle for different orientations or feature edges of a workpiece. For example, as shown in FIG. 6, a workpiece 112 may be positioned on stage 60. System 10 (FIG. 1) may be operably programmed to shift each cut edge to certain direction away from the center axis A of the stage. Initially, the process may include, calibrating the whole laser scan field using a grid pattern (FIG. 6), determining the shift distance and direction for a zero or a specific taper value cut required based on laser machining settings and feature edge orientation for a first cut, moving the machining edge to the predetermined distance and direction from the center axis A as shown in FIG. 7. Laser machining may be performed for an edge 113 with part at stationary state (scanning or moving the laser) or by moving the stage and workpiece thereon. Thereafter, the workpiece may be moved back to center, determining the shift distance and direction for a zero or a specific taper value cut required based on laser machining settings and feature edge orientation for a second cut, and moving the machining edge to the predetermined distance and direction from the center axis A as shown in FIG. 8. Laser machining may be performed for an edge 114 with part at stationary state (scanning or moving the laser) or by moving the stage and workpiece thereon. The process may be repeated for machining further edges or features such as edges 115 and 116.

Figure 9:
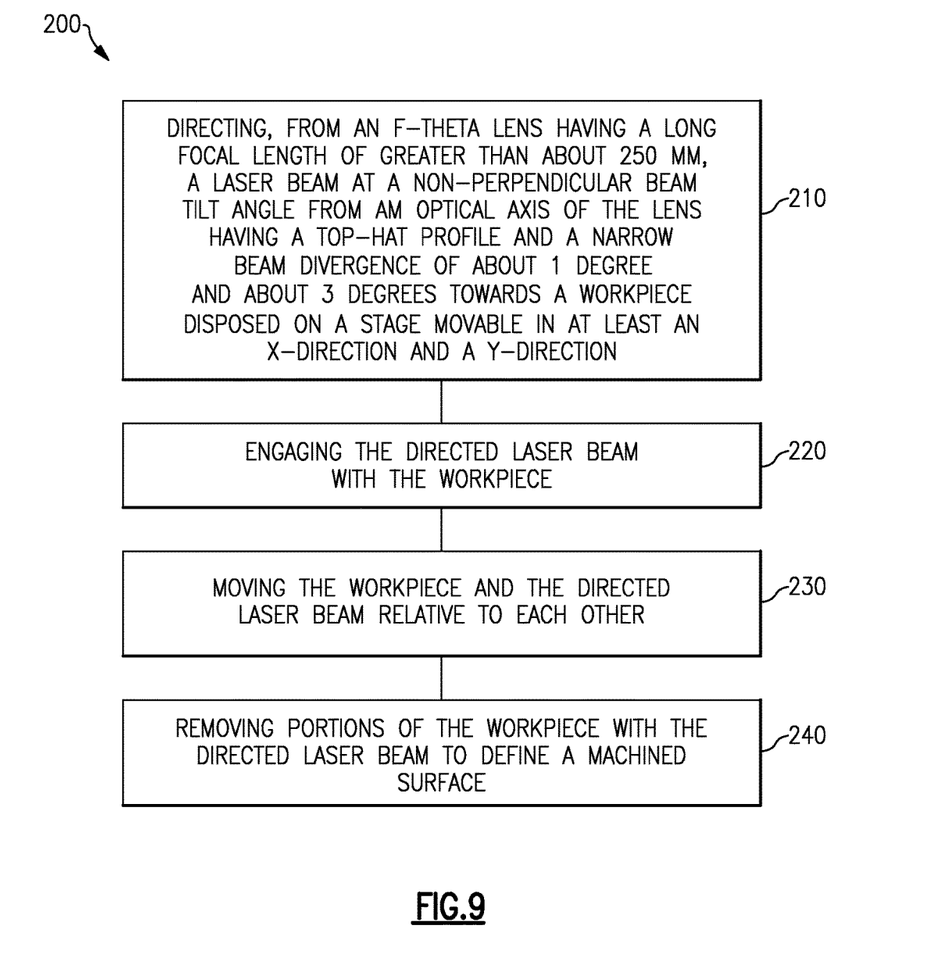
FIG. 9 is a flowchart of a method for laser machining a workpiece in accordance with aspects of the present disclosure.

FIG. 9 illustrates a flowchart of a method 200 for laser machining a workpiece in accordance with aspects of the present disclosure. Method 200 includes at 210, directing, from an F-theta lens having a long focal length of greater than about 250 millimeters, a laser beam at a non-perpendicular beam tilt angle from an optical axis of the lens having a top-hat profile and a narrow beam divergence angle of between about 1 degree and less than 3 degrees towards a workpiece disposed on a stage movable in at least an X-direction and a Y-direction. At 220, the directed laser beam is engaged with the workpiece. At 230, the workpiece and/or the directed laser beam is moved relative to each other, and at 240, portions of the workpiece are removed with the directed laser beam to define a machined surface.

In one configuration, the laser beam is directed and maintained in a fixed position, and the stage is moved. In other configurations, the motion control stage, the beam steering optics, or both may be used to position the laser beam path in relation to the workpiece to laser machine the workpiece.

The present laser machining processes of the present disclosure may be used with almost any kind of workpiece material, e.g., ceramics, metals, glass, gemstones, rubber, polymers, and composite materials. As described above, the present disclosure provides a method operable to control the taper for 2D feature cutting or slot grooving in laser machining with a scan head. A zero or even negative taper can be achieved for one or more, or all, edges of the part.

The present disclosure may allow for better tolerance control between the top and bottom of part such as for many applications such as CMC tensile bar cutting compared to current laser machining employing a larger beam divergence, shorter depth of focus, and larger power spatial distribution.

Accordingly, benefits of the present techniques may include allowing laser machining with zero or a desired taper such as laser machining CMC or other materials to meet part size tolerance requirements without physical part tilt or special trepanning optics. The present technique may also provide a less expensive and simpler taper control using only standard scan head and 2-axis planary motion hardware. Also the processing speed may be faster with less power loss through the F-theta lens having a long focal length than, for example, using a special trepanning head. The present technique may be applicable to various features on CMC components such as seal slot machining.

It is to be understood that the above description is intended to be illustrative, and not restrictive. Numerous changes and modifications may be made herein by one of ordinary skill in the art without departing from the general spirit and scope of the disclosure as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

This written description uses examples, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for laser machining a workpiece, the method comprising:
    directing, from an F-theta lens having a long focal length of greater than 250 millimeters, a laser beam at a non-perpendicular beam tilt angle from an optical axis of the lens having a top-hat profile and a narrow beam divergence angle of between 1 degree and less than 3 degrees towards a workpiece disposed on a stage movable in at least an X-direction and a Y-direction;
    engaging the directed laser beam with the workpiece;

moving the workpiece and the directed laser beam relative to each other; and removing portions of the workpiece with the directed laser beam to define a machined surface, wherein the directing comprises directing the laser beam at the non-perpendicular beam tilt angle of between 3 degrees and 6 degrees defining a usable field of view having a perimeter, and the engaging comprises engaging the directed laser beam with the workpiece disposed in the usable field of view with the axis of the directed laser beam spaced apart from the perimeter of the usable field between 15 millimeters to 30 millimeters, and the removing comprises removing portions of the workpiece with the directed laser beam so that the machined surface has generally a zero taper relative to the Z-direction.

2. The method of claim 1 wherein the directing comprises directing from the F-theta lens having a long focal length of greater than 420 millimeters.

3. The method of claim 1 wherein the laser beam is directable over a range of beam tilt angles defining a usable field of view having a perimeter, and the engaging comprises engaging the directed laser beam with the workpiece disposed in the usable field of view with the axis of the directed laser beam spaced apart from the perimeter of the usable field, and the removing comprises removing portions of the workpiece with the directed laser beam so that the machined surface has generally a zero taper relative to the Z-direction.

4. The method of claim 1 wherein the laser beam is directable over a range of beam tilt angles from the optical axis defining a usable field of view having a perimeter, and the engaging comprises engaging the directed laser beam with the workpiece disposed in the usable field of view with the axis of the directed laser beam spaced apart from the perimeter of the usable field, and the removing comprises removing portions of the workpiece with the directed laser beam so that the machined surface has a negative taper relative to the Z-direction.

5. The method of claim 1 wherein the directing comprises directing the laser beam having a top-hat profile and a narrow beam divergence at a fixed angle, and wherein the moving comprises moving the stage in the X direction and/or the Y direction.

6. The method of claim 1 wherein the directing further comprises converting a laser beam having a Gaussian profile into the directed laser beam having the top-hat profile.

7. The method of claim 6 wherein the converting comprises passing the laser beam having the Gaussian profile through an optical fiber device.

8. The method of claim 6, wherein the converting comprises passing the laser beam having the Gaussian profile through a refractive element.

9. The method of claim 6, wherein the converting comprises passing the laser beam having the Gaussian profile through a diffractive element.

10. The method of claim 1 wherein the engaging the directed laser beam with the workpiece comprises determining a shift distance and a direction from a center of a usable field of view based on the angle of the machined surface, and moving the stage to locate the portion of the workpiece to be machined a predetermined distance and direction from the center of the usable field of view.

11. The method of claim 1 wherein the providing comprises providing a ceramic matrix composite workpiece disposed on the stage.

12. The method of claim 1 wherein the removing comprises forming a line cut or forming a slot.

13. The method of claim 1, wherein the long focal length is less than 420 millimeters.

14. The method of claim 1, wherein the moving comprises tilting the stage about an X axis and/or a Y axis and/or a Z axis.

15. The method of claim 1, further comprising:
steering the laser beam to the F-theta lens at a scanning angle to the optical axis.

16. The method of claim 1, wherein steering the laser beam comprises reflecting the laser beam off a mirror.

17. The method of claim 16, wherein steering the laser beam further comprises moving the mirror.

18. A method for laser machining a workpiece, the method comprising:
directing, from an F-theta lens having a long focal length of greater than 250 millimeters, a laser beam at a non-perpendicular beam tilt angle from an optical axis of the lens having a top-hat profile and a narrow beam divergence angle of between 1 degree and less than 3 degrees towards a workpiece disposed on a stage movable in at least an X-direction and a Y-direction;
engaging the directed laser beam with the workpiece;
moving the workpiece and the directed laser beam relative to each other; and
removing portions of the workpiece with the directed laser beam to define a machined surface, wherein the laser beam is directable over a range of beam tilt angles from the optical axis defining a usable field of view having a perimeter, and the engaging comprises engaging the directed laser beam with the workpiece disposed in the usable field of view with the axis of the directed laser beam spaced within a range of about 15 millimeters from the perimeter of the usable field, and the removing comprises removing portions of the workpiece with the directed laser beam so that the machined surface has a negative taper relative to the Z-direction.

19. A method for laser machining a workpiece, the method comprising:
directing, from an F-theta lens having a long focal length of greater than 250 millimeters, a laser beam at a non-perpendicular beam tilt angle from an optical axis of the lens having a top-hat profile and a narrow beam divergence angle of between 1 degree and less than 3 degrees towards a workpiece disposed on a stage movable in at least an X-direction and a Y-direction;
engaging the directed laser beam with the workpiece;
moving the workpiece and the directed laser beam relative to each other; and
removing portions of the workpiece with the directed laser beam to define a machined surface, wherein the laser beam is directable over a range of beam tilt angles from the optical axis of between 3 degrees and 6 degrees defining a usable field of view having a perimeter, and the engaging comprises engaging the directed laser beam with the workpiece disposed in the usable field of view with the axis of the directed laser beam spaced apart from the perimeter of the usable field between 15 millimeters to 30 millimeters, and the removing comprises removing portions of the workpiece with the directed laser beam so that the machined surface has generally a zero taper relative to the Z-direction.

20. A method for laser machining a workpiece, the method comprising:
directing, from an F-theta lens having a long focal length of greater than 250 millimeters, a laser beam at a non-perpendicular beam tilt angle from an optical axis of the lens having a top-hat profile and a narrow beam divergence angle of between 1 degree and less than 3 degrees towards a workpiece disposed on a stage movable in at least an X-direction and a Y-direction;
engaging the directed laser beam with the workpiece;
moving the workpiece and the directed laser beam relative to each other; and
removing portions of the workpiece with the directed laser beam to define a machined surface, wherein the laser beam is directable over a range of beam tilt angles from the optical axis of between 3 degrees and 6 degrees defining a usable field of view having a perimeter, and the engaging comprises engaging the directed laser beam with the workpiece disposed in the usable field of view with the axis of the directed laser beam spaced within a range of 15 millimeters to 30 millimeters from the perimeter of the usable field, and the removing comprises removing portions of the workpiece with the directed laser beam so that the machined surface has a negative taper relative to the Z-direction.

* * * * *